UNITED STATES PATENT OFFICE.

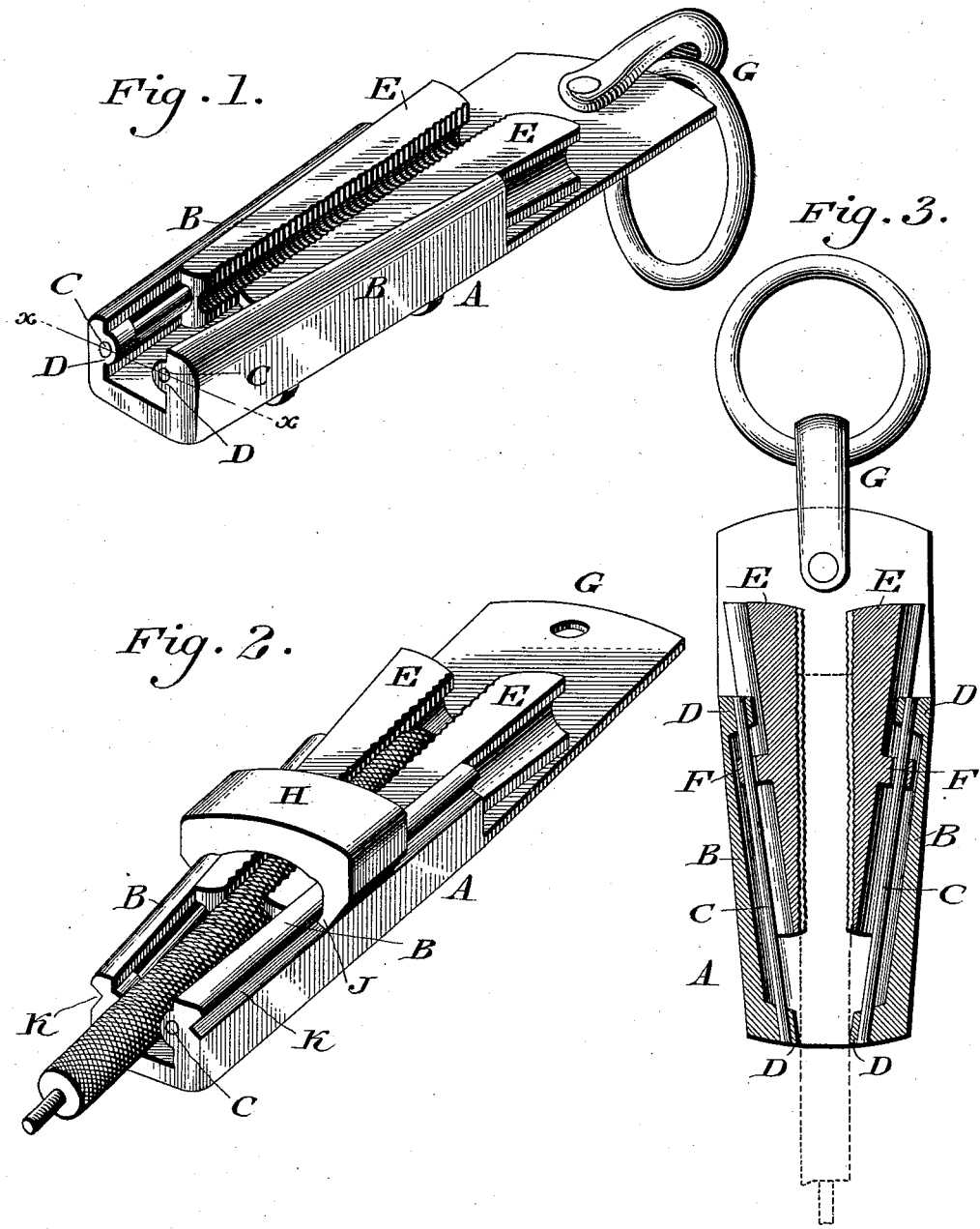

THOMAS J. COPE, OF PHILADELPHIA, PENNSYLVANIA.

GRIP FOR ROPES.

SPECIFICATION forming part of Letters Patent No. 482,975, dated September 20, 1892.

Application filed February 8, 1892. Serial No. 420,646. (No model.)

*To all whom it may concern:*

Be it known that I, THOMAS J. COPE, a citizen of the United States, residing in the city and county of Philadelphia, State of Pennsylvania, have invented a new and useful Improvement in Grips for Ropes, Cables, &c., which improvement is fully set forth in the following specification and accompanying drawings.

My invention consists of a grip for a rope, cable, &c., formed of self-tightening or automatically-acting jaws and means for supporting and guiding the same.

It also consists of a clamp for preventing spreading of the support of the jaws.

Figures 1 and 2 represent perspective views of grips for ropes, cables, &c., embodying my invention. Fig. 3 represents a longitudinal section thereof on line $x\,x$, Fig. 1.

Similar letters of reference indicate corresponding parts in the several figures.

Referring to the drawings, A designates a body or frame, on the sides of which are flanges B, which extend in the longitudinal direction thereof and form supports for rods C, whose ends are secured to lugs or ears D on said flanges.

E designates jaws whose outer sides are provided with ears F, which latter are freely fitted on the rods C, so that the jaws are permitted to slide thereon, said rods thus forming guides and supports for the jaws.

The rods C converge toward the foot end of the frame A, by which provision the jaws approach each other as they are moved toward said end.

The head end of the frame is provided with a ring, loop, or eye G, whereby the device may be held in operative position.

It will be seen that when the jaws are moved toward the head end of the frame they separate, whereby a cable, rope, &c., may be placed between the jaws, after which the jaws are closed against the cable, &c., and when the latter is subjected to draft the jaws, being directed toward the foot end of the frame, are automatically drawn inwardly, and thus wedged and tightened against the cable, &c., whereby the latter is gripped or clamped in a reliable and powerful manner. To prevent any possible slipping of the cable, &c., the inner faces of the jaws are serrated, the effect of which is evident. When the jaws are moved toward the head end of the frame, they are caused to separate, whereby the cable, &c., is released therefrom and its removal may be readily accomplished.

The ears D D, besides holding the rods C, also act as stops for preventing the jaws from disconnection from the frame.

In order to prevent spreading of the flanges of the frame, I employ a clamp H, whose sides are formed with tongues J, the latter entering grooves K in the sides of the frame A, it being noticed that the clamp extends over the flanges and jaws and embraces the sides of the latter. As the outer faces of said sides diverge toward the head end of the device, the clamp, after having its tongues entered in the grooves K, is driven toward said end, whereby it is wedged on the frame and tightly connected therewith, thus forming a brace which prevents spreading of the flanges and separation of the jaws, so that the holding action of the latter on the cable, &c., is assured.

In referring to the parts C as rods it is evident that they may be hollow or solid and of curved or angular form in cross-section. The jaws E are also partly guided on the ends of the ears D, and the inner serrated faces may be grooved, so as to more readily grip the cable.

Having thus described my invention, what I claim as new, and desire to secure by Letters Patent, is—

1. A grip for a cable, &c., consisting of a frame with side flanges thereon and automatically-tightening jaws, which are mounted on guides secured to said side flanges, substantially as described.

2. A grip for a cable, consisting of a frame having side flanges with ears, rods secured in said ears, and jaws sliding on said rods, said rods being convergent, said parts being combined substantially as described.

3. A frame having longitudinally-extending flanges thereon, lugs on the inner sides of said flanges, rods connected with said lugs, and sliding jaws which are located within said flanges and provided with ears which are fitted on said rods, said parts being combined substantially as described.

THOMAS J. COPE.

Witnesses:
JOHN A. WIEDERSHEIM,
L. JENNINGS.